(12) United States Patent
Pouliot

(10) Patent No.: US 7,856,654 B2
(45) Date of Patent: Dec. 21, 2010

(54) SYSTEM AND METHOD FOR NETWORK PERMISSIONS EVALUATION

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 1096 days.

(21) Appl. No.: 11/502,359

(22) Filed: Aug. 11, 2006

(65) Prior Publication Data

US 2008/0046961 A1 Feb. 21, 2008

(51) Int. Cl.
*G06F 17/00* (2006.01)

(52) U.S. Cl. .............................. 726/1; 726/3; 709/203; 709/224

(58) Field of Classification Search ...................... 726/1, 726/3; 713/165; 709/203, 224
See application file for complete search history.

(56) References Cited

U.S. PATENT DOCUMENTS

| | | | |
|---|---|---|---|
| 5,452,457 A | 9/1995 | Alpert et al. ................. | 395/700 |
| 6,071,316 A | 6/2000 | Goossen et al. ................. | 717/4 |
| 6,230,312 B1 | 5/2001 | Hunt ............................. | 717/4 |
| 6,282,701 B1 | 8/2001 | Wygodny et al. ............... | 717/4 |
| 6,308,275 B1 | 10/2001 | Vaswani et al. .............. | 713/201 |
| 6,560,774 B1 | 5/2003 | Gordon et al. ............... | 717/146 |
| 6,615,264 B1 * | 9/2003 | Stoltz et al. .................. | 709/227 |
| 6,802,054 B2 | 10/2004 | Faraj ........................... | 717/128 |
| 6,871,284 B2 * | 3/2005 | Cooper et al. .................. | 726/1 |
| 6,971,091 B1 | 11/2005 | Arnold et al. ............... | 717/145 |
| 7,069,554 B1 * | 6/2006 | Stammers et al. ........... | 717/178 |
| 7,171,655 B2 * | 1/2007 | Gordon et al. ............... | 717/146 |
| 7,487,221 B2 | 2/2009 | Araki .......................... | 709/208 |
| 7,512,965 B1 * | 3/2009 | Amdur et al. .................. | 726/1 |
| 7,552,472 B2 | 6/2009 | Baffes et al. .................. | 726/22 |
| 7,587,487 B1 * | 9/2009 | Gunturu ...................... | 709/224 |
| 7,590,684 B2 * | 9/2009 | Herrmann .................... | 709/203 |
| 7,620,940 B2 | 11/2009 | Goldsmith et al. .......... | 717/127 |
| 7,725,922 B2 | 5/2010 | Pouliot .......................... | 726/1 |
| 7,739,735 B2 | 6/2010 | Pouliot ......................... | 726/21 |
| 7,743,414 B2 | 6/2010 | Pouliot ......................... | 726/22 |
| 7,805,707 B2 | 9/2010 | Pouliot ..................... | 717/124 |
| 7,823,186 B2 | 10/2010 | Pouliot ........................... | 726/1 |
| 2002/0042897 A1 | 4/2002 | Klein et al. ................. | 714/718 |
| 2002/0069200 A1 * | 6/2002 | Cooper et al. .................. | 707/9 |
| 2002/0198675 A1 | 12/2002 | Underseth et al. ........... | 702/122 |

(Continued)

OTHER PUBLICATIONS

Author: Nicodemos C. Damianou Title: A Policy Framework for Management of Distributed System Date: Feb. 2002.*

(Continued)

*Primary Examiner*—Thanhnga B Truong
(74) *Attorney, Agent, or Firm*—Pillsbury Winthrop Shaw Pittman LLP

(57) ABSTRACT

The invention is a system and method for delegating security permission evaluation from a client computer to remote network service (e.g., a security server). The centralization of permission evaluation allows performance enhancements using rules compilation and better manageability. An application on a client machine may request a permission to access a resource at runtime and provide evidence data to a security server. The permission evaluation (the decision) is executed by the network service and enforced locally on the client machine. When the application runs on top of a virtual machine, its security manager may be used to hide all of the client-side processes, and thus providing the extra information to the network service in order to locally enforce the results.

18 Claims, 2 Drawing Sheets

U.S. PATENT DOCUMENTS

| | | | | |
|---|---|---|---|---|
| 2003/0041267 | A1 | 2/2003 | Fee et al. | 713/201 |
| 2003/0065942 | A1* | 4/2003 | Lineman et al. | 713/201 |
| 2003/0110192 | A1* | 6/2003 | Valente et al. | 707/513 |
| 2003/0115484 | A1* | 6/2003 | Moriconi et al. | 713/201 |
| 2003/0177355 | A1* | 9/2003 | Elgressy et al. | 713/167 |
| 2003/0196114 | A1 | 10/2003 | Brew et al. | 713/201 |
| 2003/0225822 | A1 | 12/2003 | Olson et al. | 709/202 |
| 2004/0103323 | A1* | 5/2004 | Dominic | 713/202 |
| 2004/0250112 | A1* | 12/2004 | Valente et al. | 713/200 |
| 2005/0071668 | A1 | 3/2005 | Yoon et al. | 713/200 |
| 2005/0172126 | A1 | 8/2005 | Lange et al. | 713/166 |
| 2005/0240999 | A1 | 10/2005 | Rubin et al. | 726/22 |
| 2005/0262517 | A1 | 11/2005 | French | 719/316 |
| 2006/0064737 | A1 | 3/2006 | Wallace | 726/1 |
| 2006/0117299 | A1 | 6/2006 | Goldsmith et al. | 717/124 |
| 2006/0143396 | A1 | 6/2006 | Cabot | 711/134 |
| 2006/0150021 | A1 | 7/2006 | Traskov et al. | 714/37 |
| 2006/0235655 | A1 | 10/2006 | Qing et al. | 702/186 |

OTHER PUBLICATIONS

Author: Scott Oaks Title: Java Security, 2nd Edition Date: May 17, 2001 Publisher: O'Reilly Media, Inc.*

Clark, Jason, "Return of the Rich Client—Code Access Security and Distrubtion Features in .NET Enhance Client-Side Apps", *MSDN Magazine*, printed from http://msdn.microsoft.com/msdnmag/issues/02/06/rich/default.aspx, Jun. 2002, 16 pages.

Mono, "MON:Runtime—The Mono Runtime", printed from http://www.mono-project.com/Mono:Runtime, Jan. 24, 2006, 8 pages.

Mono, "Assemblies and the GAC—How Mono Finds Assemblies", printed from http://www.mono-project.com/Assemblies_and_the_GAC, Jul. 20, 2005, 11 pages.

Alcazar, Mark, "Windows Presentation Foundation Security Sandbox", MSDN Library, Microsoft Corporation, printed from http://msdn.microsoft.com/library/en-us/dnlong/html/wpfsecuritysandbox.asp?frame=true, Sep. 2005, 9 pages.

Novell AppArmor Powered by Immunix 1.2 Installation and QuickStart Guide, Sep. 29, 2005, 18 pages.

Sundmark et al., "Monitored Software Components—A Novel Software Engineering Approach", *Proceedings of the 11th Asia-Pacific Software Engineering Conference* (APSEC'04), Nov. 30-Dec. 3, 2004, pp. 624-631.

Sokolsky et al., "Steering of Real-Time Systems Based on Monitoring and Checking", *Proceedings of the Fifth International Workshop*, Nov. 18-20, 1999, pp. 11-18.

* cited by examiner

SYSTEM AND METHOD FOR NETWORK PERMISSIONS EVALUATION

FIELD OF INVENTION

The invention relates to a system and method for extending a client security infrastructure to transparently delegate, during application runtime, the evaluation of security permissions to network services.

BACKGROUND

Permission evaluation is the concept of applying a set of rules to grant or deny access to resources, such as files, directories or other pieces of information on a computer. Virtual machine (VM), implemented according to a runtime standard, may request permissions to their security manager in order to access these various resources. A security manager installed on a client machine enables a custom security policy to be set for an application. For example, in an ECMA-335 (Common Language Infrastructure) VM, Code Access Security (CAS) is the security manager mechanism that limits the access an application code has to protected resources. CAS is implemented locally at each computer where the VM resides. CAS uses local policies with code evidence to define permission and permission sets that represent the application rights to access various system resources. At application runtime CAS compares requested permission with one or more security policies. Unauthorized actions are prevented from executing using these security checks. Other VM, like Java, use similar mechanisms, to evaluate application permissions.

In the past, three types of application permissions have been developed, that is, products with very basic access control, products with complex access control rules within an application, and products with no access control. Very basic access control (e.g., multiple permissions' flags encoded as bits and stored with a file entry) may bare little resemblance to an organization's requirements. As such, basic control may be suitable for a file system but not enough for a more complex environment such as a financial system. However, products with complex access control rules within applications are often difficult or even impossible to modify by the end-user of the application (e.g. enterprise hosting a web service). Finally, some products do not have any kind of access control.

Even applications providing access controls are often insufficient or incompatible with the user requirements, with the end result that they are often unused or even turned off. This situation has lead to the creation of new security standards and new security toolkits. These toolkits share properties that include, access control rules that are external to applications, rules resolution (e.g., decision making) that are internal to applications, rules that are human readable (e.g. ASCII, XML), rules that are mostly generated by tools, rules that can be complex (e.g. they can contain XPath expressions, regular expressions, scripts, etc.), and rules that can consume assertions made by other services. XACML (eXtensible Access Control Markup Language) is an example of such a language. SAML (Security Assertion Markup Language) is an example of a specification to consume/produce security assertions.

XACML is a standard for defining a general policy language used to protect resources as well as an access control decision language. Policy language allows administrators to define the access control requirements for their application resources.

SAML is an XML-based framework for Web services that enables the exchange of authentication and authorization information among business partners.

The addition of more complex security tools and decisions on a client machine, while useful, also have their drawbacks. In performing extensive security processes, the client system may result in overall performance slow down. Parsing and evaluating the required files and expressions within the client machine can be very time consuming, not to mention that many client machines of a network could be simultaneously taking the same action. In some cases the same files and expressions are evaluated many times for the same user and resource, a clearly inefficient situation.

As such, there is a need for evaluating complex security rules and decisions with less affect on client computer performance. There is a need to provide better overall performance for large-scale adaptation of access controls. The main disadvantage of the current implementation being that access control polices are inefficiently implemented for a large number of systems because maintenance and modifications to access control rules on each client machine becomes more difficult as more users and rules are added to the system.

SUMMARY

Various aspects of the invention overcome at least some of these and other drawbacks of known systems. The invention is an improvement in the way complex access control rules can be used from both a performance and a manageability point of view. Performance is a key element to the large-scale adoption of new access control technologies. By way of example, a request for accessing a file may be delegated to a remote server, in order to provide an authorization for the requested permission. Thus, a security decision usually made on a local machine may be made at a network location and the result (e.g., pass/fail) may be sent back to the local machine for enforcement. Performance is gained by using dedicated resources and new optimizations to evaluate permissions. Manageability is gained by the centralization of the evaluation from many client machines to a few centralized network services.

According to one aspect of the invention, a network service may be implemented on a security server to receive security rules (logic and data) from other servers and network services; store the received rules; compile the rules with its own access control policies; receive code evidence and a request for permission to access a resource and forward the evaluation result to the client machine.

According to another aspect of the invention, a client computer runs application code; requests permission to perform an operation to a network service; provides application code evidence with request; receives access control instructions; enforces received access control instruction on application. Client computer may include a security manager for requesting permissions and enforcing its results. Security manager on a client machine (e.g., CAS) may transparently invoke a network connection and forward request and code evidence to the security server. In the latter case the application itself does not have any knowledge of where and how the security decisions are made. This makes it possible to use the invention with existing applications using a security manager, for example in all .NET and Java applications.

Further aspects of the invention recognize some important facts that limit today's performance. A large part of access control rules, both the logic and its data, are static in nature. Many details are included in the definitions (e.g. XACML) or file formats (e.g. XML) to make them human readable. Rules logic and data generally do not change drastically over time, the proof being that most of them are currently hard-coded in the older-model applications. According to an aspect of the current invention, a security server may compile the static parts of the access control rules into managed or native code. The compilation may be used to perform more advanced optimizations, for example, a true/false evaluation at compilation time (e.g., invariant elimination), which incurs little to no runtime cost. A change in a rule definition (e.g., a file update) can trigger a re-compilation of the rule at the security server, thus ensuring that the compiled rule is up to date before being executed. The time required to compile rules is rapidly gained back by reduced rule execution time and some information on which the rules are applied change more often (e.g., user, role, time, etc.). This dynamic information may not be compiled, because they exist as variables on which the compiled rules are executed against.

The invention takes advantage of network resources to make security decisions that may then be enforced locally. The invention implements security policies and security instructions from a security server or other source, therefore relieving client machine resources for other processes. These and other objects, features and advantages of the invention will be apparent through the detailed description of the embodiments and the drawings attached hereto. It is also to be understood that both the foregoing general description and the following detailed description are exemplary and not restrictive of the scope of the invention.

DETAILED DESCRIPTION OF DRAWINGS

DETAILED DESCRIPTION

The invention enables significant performance gains by compiling complex access control rules using a network service (e.g., security server), wherein several client applications can share the same compiled access control rules. Centralized sharing of the same rules works to eliminate the risk of having different applications, rules, and versions coexisting on the same network. It also makes it a lot easier to update the access control logic since it is centralized into a few, possibly a single, component.

Figure 1:
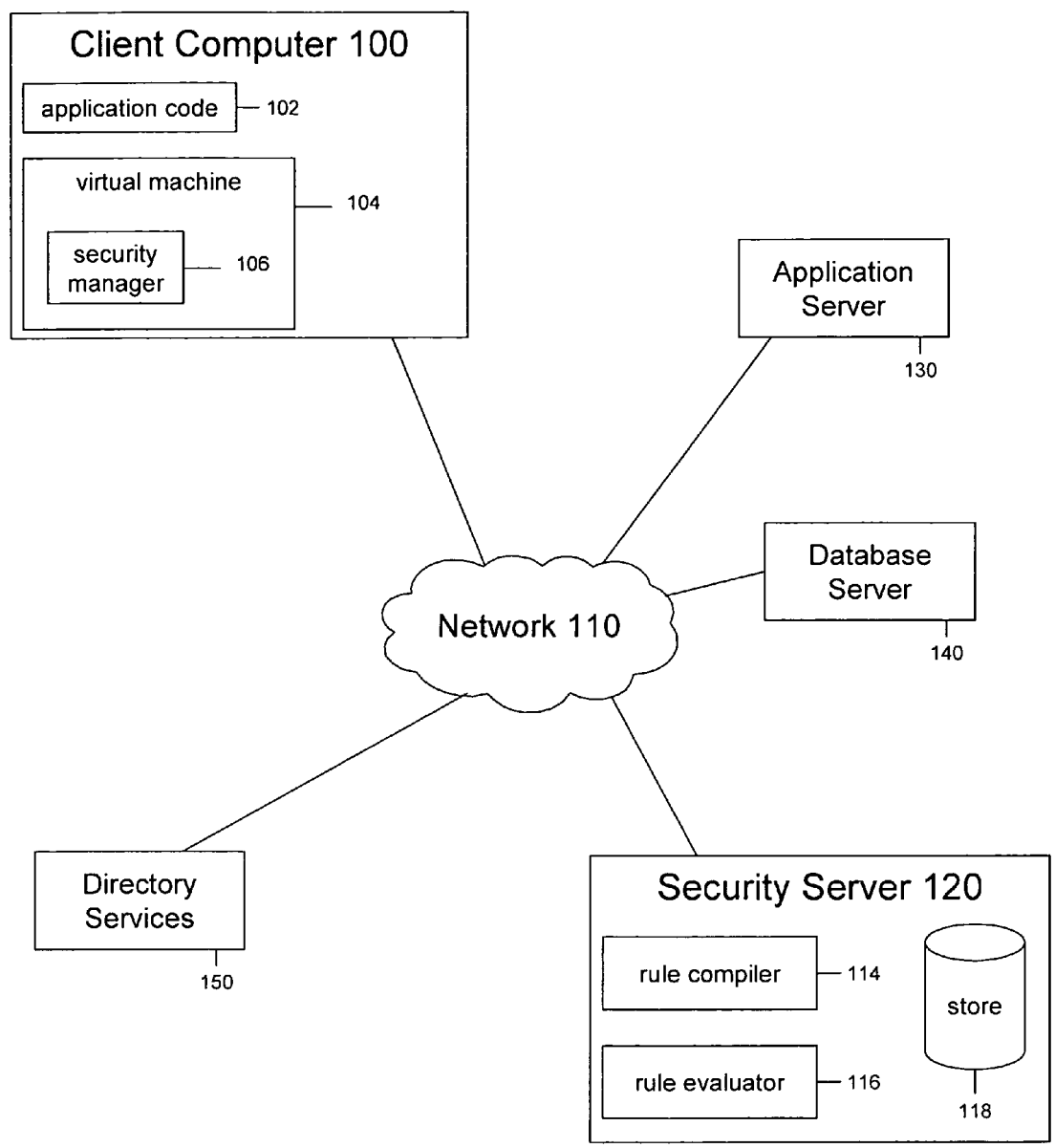
FIG. 1 is a high-level block diagram for a system, according to one embodiment of the invention.

FIG. 1 is a high level block diagram of a client computer and server, among other things. A client computer 100 may include application code(s) 102, virtual machine (VM) 104, which may include a security manager 106 among other things. A network service acting as a security server 120 may include a rule compiler 114, rule evaluator 116 and a storage for the compiled rules logic and data 118. Other network resources may be linked to the network 110, including but not limited to, application server(s) 130, database server(s) 140, directory service(s) 150 and other client computers. The network of FIG. 1 is scalable to accommodate multiple client computers with one or more security servers.

Security server 120 may be located in logical and/or physical proximity to client computer 100 or to the other servers 130, 140, 150. Client computer 100 may encompass other types of client devices and should not be limited to personal computer. For example, client machine may be a mobile device, like a cell-phone, or other device, like an embedded system. Client computer may also operate in an off-line mode if needed. In an off-line mode the permission evaluation may use cached information from previous communication with the servers, and consider their results as valid as long as a response timestamp is still valid.

During client computer operations the application 102 and/or security manager 106 of the virtual machine 104 on client computer 100 may request permission(s) to access application resources (e.g., files, directories, process). Permissions may represent the right to access various system and network resources based on security policies. A set of permissions may be determined for an application code based on the security policy and evidence provided by the application code including, but not limited to, identity, publisher, source (e.g., URL, website), origin (e.g., Internet, Intranet) and/or other information about the application seeking permission. With an ECMA-335 VM, the application and its assemblies (e.g., .DLL files, .EXE files) may specify the requested permissions using declarative or imperative security. Declarative security allows the developer of the application code to insert permission attributes into the code itself whereas imperative security may allow the developer to specify permissions dynamically within source code. Both types are well known in code development and execution. The present invention is able to delegate the permission evaluation to a network service without requiring change to existing VM and security manager, enabling existing applications to gain both performance and manageability advantages without extensive changes.

According to one aspect of the invention, an application 102 running on a client computer 100, may request permissions from a network service running on a security server. This request may include at least, the requested permission (e.g. access file "secret.doc") and some evidences to help evaluation (e.g. current user is "Bob").

Alternatively, an application 102 may be executed under a virtual machine 104. In this case the application's declarative and/or imperative security may request permissions from the VM security manager 106, which can delegate the permission evaluation to a network service running on a security server 120. The request may include the XML representation of the permission, the current call stack, application domain, and assembly's evidences. In this case changes to the application itself are minor due to the transparency of the security manager's actions.

In both cases, a security server 120 can use the rule compiler 114 to compile its stored security policies from storage 118 and any other rules it receives from other servers 130, 140, 150. This allows static access control rules and definitions to be compiled for more efficient security evaluation when permissions are requested from client computers 100. Using the code evidences and permission request supplied by the client computer 100 the compiled rules may be executed, with a greater speed than interpreted rules. In the event that a rule does change, the rule can trigger a re-compilation at the security server.

Figure 2:
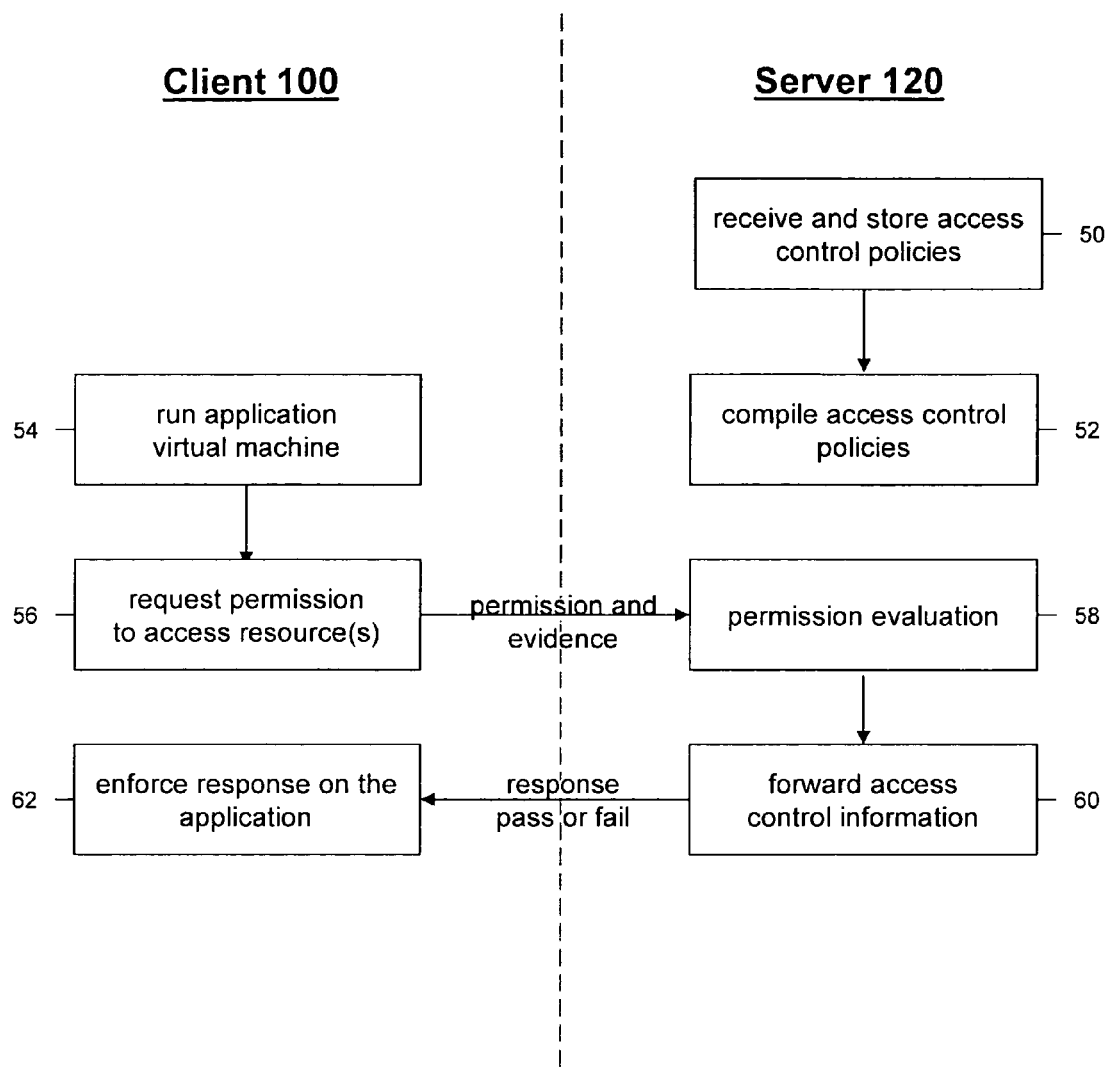
FIG. 2 is a diagram for a method of a client server process, according to one embodiment of the invention.

FIG. 2 is a flow diagram for client and server operations, according to an aspect of the invention. A security server 120 may receive access control policy, security policy and/or other security information from application host server(s), client computer(s), and/or other sources (operation 50). The information can either be pulled from the security server (e.g., retrieving an update from a remote database server at a specified time) or pushed from a remote server (e.g., an update when a new user is being added to the directory services). Such pull and/or push mechanisms may be configured on each security server 120 and does not require updates to every client computer 100. Received information may be stored at security server storage 118 or other location, for example a remote database server 140. Security server 120 may have logic incorporating the ability to compile and execute access control security. Security server 120 may compile the rules, using the rule compiler 114 and the information contained in storage 118, before, during or after an application is instantiated on client computer 100 (operation 52). Client computer begins execution of an application (operation 54), which includes one or more request for permissions (operation 56). The request may be made directly to security server 120 or indirectly via the security manager 106 of the client computer 100. The security server 120 receives the request for permission, either directly from the application runtime or indirectly via security manager 106. In both cases, the security server 120 receives request accompanied with application evidence. The evidence information may be sent to security server via XML standards. The evidence is combined with the permission request and provided to the security server 120. The security server 120 may parse, interpret, and evaluate which actions to take based on the information (operation 58). After access control has been remotely evaluated, the security server 120 forwards (operation 60) the resulting information to client computer 100 for local enforcement (operation 62).

Delegated permission evaluation allows the security permissions to be judged outside the client machine. Further optimization may be made by security server 120 in specific contexts. For example, the repetitive pattern of asking for network resources can be cached. Thus, a response to request for a web service (e.g. service discovery) from a client computer 100 can be made almost instantly when presented a second or subsequent time. Caching the results of the web service for a policy defined time can lower bandwidth usage and improve performance without sacrificing security. Caching can also be implemented at the client computer 100. In this case the security server 120 may add a timestamp within a response. This timestamp can indicate an interval of time, between now and a specified time, for which the result is known to be valid. Client-side caching may be useful when client computers 100 are executing in an offline mode.

A further optimization technique is possible if parts of some rules logic are expected to change often. For example, it may be that a large part of the rule is static and a minor part is dynamic. Splitting such rules into several smaller rules and compiling the rules independently (e.g., one assembly per rule file) can improve performance in the case that some (top) rules are being generated very frequently or automatically for each request. The change of one or more rule(s) can trigger a selective recompilation at security server 120. The impact of the changes is still very small compared to the gains made by compiling the rules.

Thus, the client machine's environment may remain unchanged with respect to evolving security rules. The client computer 100 supplies the evidence in order for the security server 120 to evaluate the security permissions and the client computer 100 enforces the policies sent back from the security server 120. The client computer 100 requests permissions and receives permissions with little regard as to where the security decision came from. The client may be further optimized when applications are executed on a virtual machine where the security manager can be extended to provide such services transparently.

A networked permission also has the advantage of being very generic. The client computer 100 may have limited (little to none) knowledge about the rules used to evaluate the requested permission. Such rules can be changed without affecting the local applications, even while the local applications are executing on the client computer 100.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

I claim:

1. A computer implemented method for network permissions evaluation, comprising:
   storing a plurality of security rules in a storage device coupled to a security server, wherein the plurality of security rules include one or more static rules;
   compiling, on the security server, the one or more static rules into native code;
   receiving, at the security server, a request for permission to access a resource, wherein the request includes code evidence for an application executing on a client machine, and wherein the application executes on the client machine under a virtual machine having a security manager that delegates evaluating the request for the permission to the security server;
   evaluating the request for the permission on the security server, wherein evaluating the request includes executing the native code compiled from the static rules to evaluate the code evidence included in the request and determine whether the application executing on the client machine has the permission to access the resource associated with the request;
   forwarding a result of the security server evaluating the request for the permission to the client machine, wherein the security manager associated with the virtual machine locally enforces the result forwarded from the security server on the client machine; and
   caching the result of the security server evaluating the request for the permission, wherein caching the result includes one or more of:
      including a time stamp in the result forwarded from the security server to the client machine, wherein the client machine caches the result forwarded from the security server for a predetermined time interval according to the time stamp included in the result; or
      the security server caching the result for a policy defined time interval, wherein the cached result remains valid for subsequent requests for the permission received at the security server during the policy defined time interval.

2. The method of claim 1, wherein the result forwarded from the security server indicates whether the application executing on the client machine has the permission to access the resource associated with the request.

3. The method of claim 1, wherein the application includes declarative or imperative security that provides the request for the permission to the security manager associated with the virtual machine.

4. The method of claim 3, wherein the security manager transparently invokes a network connection with the security server to transmit the request for the permission to the security server.

5. The method of claim 1, wherein the plurality of security rules further include one or more dynamic rules, and wherein evaluating the request for the permission on the security server further includes interpreting the dynamic rules to evaluate the code evidence included in the request and determine whether the application executing on the client machine has the permission to access the resource associated with the request.

6. The method of claim 1, wherein the code evidence included in the request includes one or more of a current call stack for the application, a domain for the application, or evidence for one or more assemblies included in the application.

7. The method of claim 1, wherein the cached result forwarded from the security server remains valid for subsequent requests for the permission at the client machine during the predetermined time interval.

8. The method of claim 1, further comprising:
   determining, on the security server, that at least one of the plurality of security rules include a static portion and a dynamic portion; and
   compiling, on the security server, the static portion of the at least one security rule into native code, wherein evaluating the request for the permission on the security server further includes executing the native code compiled from the static portion of the at least one security rule to evaluate the code evidence included in the request and determine whether the application executing on the client machine has the permission to access the resource associated with the request.

9. The method of claim 1, further comprising re-compiling, on the security server, at least one of the static rules in response to an update to the at least one static rule.

10. A computer system for network permissions evaluation, comprising:
    a storage device configured to store a plurality of security rules, wherein the plurality of security rules include one or more static rules; and
    a security server coupled to the storage device, wherein the security server is configured to:
    compile the one or more static rules into native code;
    receive a request for permission to access a resource, wherein the request includes code evidence for an application executing on a client machine, and wherein the application executes on the client machine under a virtual machine having a security manager that delegates evaluating the request for the permission to the security server;
    evaluate the request for the permission on the security server, wherein evaluating the request includes executing the native code compiled from the static rules to evaluate the code evidence included in the request and determine whether the application executing on the client machine has the permission to access the resource associated with the request;
    forward a result of the security server evaluating the request for the permission to the client machine, wherein the security manager associated with the virtual machine locally enforces the result forwarded from the security server on the client machine; and
    cache the result of the security evaluating the request for the permission, wherein to cache the result, the security server is further configured to:
    include a time stamp in the result forwarded from the security server to the client machine, wherein the client machine caches the result forwarded from the security server for a predetermined time interval according to the time stamp included in the result; or
    cache the result for a policy defined time interval, wherein the cache result remains valid for subsequent requests for the permission received at the securit server during the policy defined time interval.

11. The system of claim 10, wherein the result forwarded from the security server indicates whether the application executing on the client machine has the permission to access the resource associated with the request.

12. The system of claim 10, wherein the application includes declarative or imperative security that provides the request for the permission to the security manager associated with the virtual machine.

13. The system of claim 12, wherein the security manager transparently invokes a network connection with the security server to transmit the request for the permission to the security server.

14. The system of claim 10, wherein the plurality of security rules further include one or more dynamic rules, and wherein evaluating the request for the permission on the security server further includes interpreting the dynamic rules to evaluate the code evidence included in the request and determine whether the application executing on the client machine has the permission to access the resource associated with the request.

15. The system of claim 10, wherein the code evidence included in the request includes one or more of a current call stack for the application, a domain for the application, or evidence for one or more assemblies included in the application.

16. The system of claim 10, wherein the cached result forwarded from the security server remains valid for subsequent requests for the permission at the client machine during the predetermined time interval.

17. The system of claim 10, wherein the security server is further configured to:
    determine that at least one of the plurality of security rules include a static portion and a dynamic portion; and
    compile the static portion of the at least one security rule into native code, wherein evaluating the request for the permission on the security server further includes executing the native code compiled from the static portion of the at least one security rule to evaluate the code evidence included in the request and determine whether the application executing on the client machine has the permission to access the resource associated with the request.

18. The system of claim 10, wherein the security server is further configured to re-compile at least one of the static rules in response to an update to the at least one static rule.

* * * * *